(12) United States Patent
Barnichon (10) Patent No.: US 7,129,992 B2
(45) Date of Patent: Oct. 31, 2006

(54) METHOD AND SYSTEM FOR VIDEO DISPLAY WITH AUTOMATIC REFRAMING

(75) Inventor: Christophe Barnichon, Grenoble (FR)

(73) Assignee: STMicroelectroniccs SA, Montrouge (FR)

( * ) Notice: Subject to any disclaimer, the term of this patent is extended or adjusted under 35 U.S.C. 154(b) by 558 days.

(21) Appl. No.: 10/678,967

(22) Filed: Oct. 3, 2003

(65) Prior Publication Data

US 2004/0119891 A1    Jun. 24, 2004

(30) Foreign Application Priority Data

Oct. 3, 2002    (FR) .................................. 02 12233

(51) Int. Cl.
H04N 7/01    (2006.01)
H04N 5/46    (2006.01)
(52) U.S. Cl. ...................... 348/556; 348/913; 348/558; 348/445; 348/739
(58) Field of Classification Search ................ 348/556, 348/558, 445, 913, 555, 580, 581, 739, 467, 348/469; 345/660, 698
See application file for complete search history.

(56) References Cited

U.S. PATENT DOCUMENTS

| | | | | |
|---|---|---|---|---|
| 5,182,644 A | * | 1/1993 | Kimata et al. ............... | 348/451 |
| 5,223,929 A | * | 6/1993 | Sugimori et al. ........... | 348/469 |
| 5,249,049 A | * | 9/1993 | Kranawetter et al. ....... | 348/473 |
| 5,309,234 A | * | 5/1994 | Kranawetter et al. ....... | 348/473 |
| 5,345,270 A | * | 9/1994 | Saeger et al. ............. | 348/435.1 |
| 5,351,135 A | * | 9/1994 | Saeger ..................... | 348/435.1 |
| 5,442,403 A | * | 8/1995 | Yasumoto et al. ......... | 348/432.1 |
| 5,486,870 A | * | 1/1996 | Decreamer ................ | 348/556 |
| 5,486,871 A | * | 1/1996 | Filliman et al. ............ | 348/558 |
| 5,581,304 A | * | 12/1996 | Wang ....................... | 348/558 |
| 5,686,970 A | * | 11/1997 | Tani et al. ................. | 348/558 |
| 5,748,257 A | * | 5/1998 | Kawabata et al. .......... | 348/615 |
| 5,760,840 A | * | 6/1998 | Tani et al. ................. | 348/558 |
| 5,949,494 A | * | 9/1999 | Yamagata et al. ......... | 348/558 |
| 5,956,091 A | * | 9/1999 | Drewery et al. ........... | 348/445 |
| 6,115,072 A | * | 9/2000 | Vuong et al. .............. | 348/445 |
| 6,208,385 B1 | * | 3/2001 | Konishi et al. ............ | 348/558 |

(Continued)

Primary Examiner—David Ometz
Assistant Examiner—Jean W. Désir
(74) Attorney, Agent, or Firm—Lisa K. Jorgenson; Stephen Bongini; Fleit, Kain, Gibbons, Bianco P.L.

(57) ABSTRACT

A system and method are provided for displaying a video composed of images each comprising a predetermined number M of lines and, a predetermined number N of pixels in each line. Values of a predetermined number P of reference pixels for each line of a current image of the video are stored in memory, where P is less than N. For each line of the current image, the value of a parameter associated with the line is determined, with the parameter corresponding to the number of the reference pixels of the line that are black according to a first predetermined criterion. A first nonblack line and a last nonblack line of the current image are determined to serve as a basis for an automatic reframing of the images of the video before display. The first nonblack line of the current image is determined by excluding, starting from a first line of the image, the lines of the image which are black according to a second predetermined criterion based on the parameter, and the last nonblack line of the current image is determined by excluding, starting from a last line of the image, the lines of the image which are black according to the second predetermined criterion based on the parameter.

28 Claims, 4 Drawing Sheets

U.S. PATENT DOCUMENTS

| | | | |
|---|---|---|---|
| 6,262,772 B1 * | 7/2001 | Shen et al. | 348/445 |
| 6,330,037 B1 * | 12/2001 | Nakajima et al. | 348/607 |
| 6,340,992 B1 * | 1/2002 | Markandey | 348/556 |
| 6,366,706 B1 * | 4/2002 | Weitbruch | 382/254 |
| 6,621,927 B1 * | 9/2003 | Mori et al. | 382/173 |
| 6,690,425 B1 * | 2/2004 | Worrell | 348/445 |
| 6,947,097 B1 * | 9/2005 | Joanblanq | 348/558 |
| 6,995,780 B1 * | 2/2006 | Yamada | 345/698 |

* cited by examiner

METHOD AND SYSTEM FOR VIDEO DISPLAY WITH AUTOMATIC REFRAMING

CROSS-REFERENCE TO RELATED APPLICATIONS

This application is based upon and claims priority from French Patent Application No. 02-12233, filed Oct. 3, 2002, the entire disclosure of which is herein incorporated by reference.

BACKGROUND OF THE INVENTION

1. Field of the Invention

The present invention relates to image processing, and more specifically to systems and methods for displaying with automatic reframing a video on a display screen such as a television screen.

2. Description of Related Art

The available display screens exhibit a predetermined screen ratio (also referred to as the video format or aspect ratio or aspect format), that is to say the width/height ratio of an image. For example, standard televisions have a screen ratio of 1.33:1 (4/3 or standardized format), that is to say they are 1.33 times as wide as they are high. Likewise, widescreen televisions have a screen ratio of 1.78:1 (16/9 or widescreen format). Certain televisions may effect the display of images selectively according to one or the other of these formats, or even according to other formats (in particular, for some, a 14/9 format). Moreover, certain more recent display devices, such as LCD ("Liquid Crystal Display") or plasma screens, exhibit screen ratios of still different values.

Aside from this, the video images to be displayed have a screen ratio which may vary depending on the origin of the video. Thus, videos obtained via mass-market video cameras such as camcorders generally have a 4/3 format. On the other hand, films produced for television typically have a 16/9 format. Furthermore, cinema films can have a screen ratio of 2.35:1 (Cinemascope format) or of 1.85:1 (Panavision format, Vistavision format, etc.), for example.

Video broadcasting as standardized according to the recommendations of the ITU (International Telecommunication Union), formerly the CCIR (Comité Consultatif International des Radiocommunications), involves a 4/3 format both for images having 525 lines and for those having 625 lines. A cinema film, for example, is therefore processed according to a "Letterbox" technique which adds black bands at the top and bottom of the original images (without modifying them), so that the images broadcast are displayed without distortion on a standard television (4/3 format).

Figure 1:
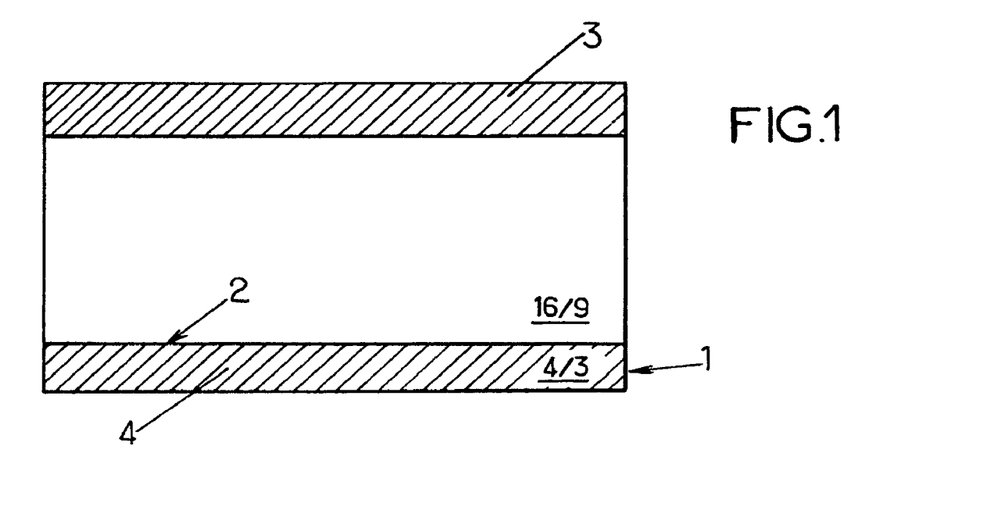
FIG. 1 is a diagram illustrating an image in the "Letter-box" format.

FIG. 1 shows an example of an image thus processed so as to allow broadcast according to the aforesaid recommendations of the ITU. Such an image is said to be in the "Letterbox" format. In the example shown, the outer box 1 corresponds to the 4/3 format image, and the inner box 2 corresponds to the 16/9 format image, that is to say to the active video. The difference between these two images resides in the upper horizontal black band 3 and lower horizontal black band 4.

The need exists for a process that makes it possible to automatically detect the format of a video to be displayed, so as to adjust the display parameters in such a way as to optimize the display. Such a process could be used to implement a reframing of the images received in the "Letterbox" format, for example a zoom, so that the active video is displayed in full screen mode on a 4/3 format screen, that is to say without having horizontal black bands appear.

For this purpose, it is known to detect the upper and lower black lines of the video image, according to various methods that have been proposed. This amounts to detecting the active video within the video.

These known methods nevertheless exhibit insufficient accuracy, in the sense that the detection of the black lines may be deficient in a certain number of situations, depending on the content of the images. Moreover, the known methods exhibit limitations in terms of flexibility (e.g., no possibility of changes) as well as a higher cost when they are implemented in hardware.

SUMMARY OF THE INVENTION

In view of these drawbacks, it is an object of the present invention to overcome the above-mentioned drawbacks and to provide an improved system and process for automatically detecting the format of a video to be displayed.

Another object of the present invention is to provide a system and process for reframing of images received in "Letterbox" format so that the active video is displayed in full screen mode.

According to a first aspect, the present invention proposes a method for displaying a video composed of images each comprising a predetermined number M of lines and, a predetermined number N of pixels in each line, where M and N are integers. According to the method, values of a predetermined number P of reference pixels for each line of a current image of the video are stored in memory, where P is an integer that is less than N. For each line of the current image, the value of a parameter associated with the line is determined, with the parameter corresponding to the number of the reference pixels of the line that are black according to a first predetermined criterion. A first nonblack line and a last nonblack line of the current image are determined to serve as a basis for an automatic reframing of the images of the video before display. The first nonblack line of the current image is determined by excluding, starting from a first line of the image, the lines of the image which are black according to a second predetermined criterion based on the parameter, and the last nonblack line of the current image is determined by excluding, starting from a last line of the image, the lines of the image which are black according to the second predetermined criterion based on the parameter.

According to a second aspect, the present invention proposes a system for displaying a video composed of images each comprising a predetermined number M of lines, and a predetermined number N of pixels in each line, where M and N are integers. The system includes a memory, first means, and second means. The memory stores values of a predetermined number P of reference pixels for each line of a current image of the video, where P is an integer that is less than N. The first means determines, for each line of the current image, the value of a parameter associated with the line, the parameter corresponding to the number of the reference pixels of the line that are black according to a first predetermined criterion, and determines a first nonblack line of the current image by excluding, starting from a first line of the image, the lines of the image which are black according to a second predetermined criterion based on the parameter, and determines a last nonblack line of the current image by excluding, starting from a last line of the image, the lines of the image which are black according to the second predetermined criterion based on the parameter. The second means automatically reframes the current image before display based on a first nonblack line and a last nonblack line.

Advantageously, the sub-sampling of the image which results from the consideration of only the reference pixels gives better results for the detection of the black bands. Another advantage of the present invention is that it can be implemented in software form, so that changes are possible at less cost. Furthermore, the fact that only some of the pixels of the image are processed (namely, the reference pixels) decreases the number of calculations and the resources required.

Other objects, features and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

In the following description, the term "image" is used generically to designate either a video image or a video frame. Moreover, in accordance with the jargon of a person of ordinary skill in the art, "active video" designates the portion of an image which carries the action, that is to say which goes from the first to the last video line which are not black lines.

The words such as "first", "last", and "next", when they pertain to lines of the image, are here conventionally used with reference to the order of transmission of the information coding the video lines, according to which of the video lines of each image are transmitted in succession commencing with the top line and finishing with the bottom line of the image. It will be noted that this convention is not affected by the fact that the video lines are generally transmitted with interlacing, that is to say in two fields for one image. A field corresponds to one of the two halves of an image in an interlaced display system, a first half of the image being constituted by the odd lines and a second half being constituted by the even lines.

Figure 2:
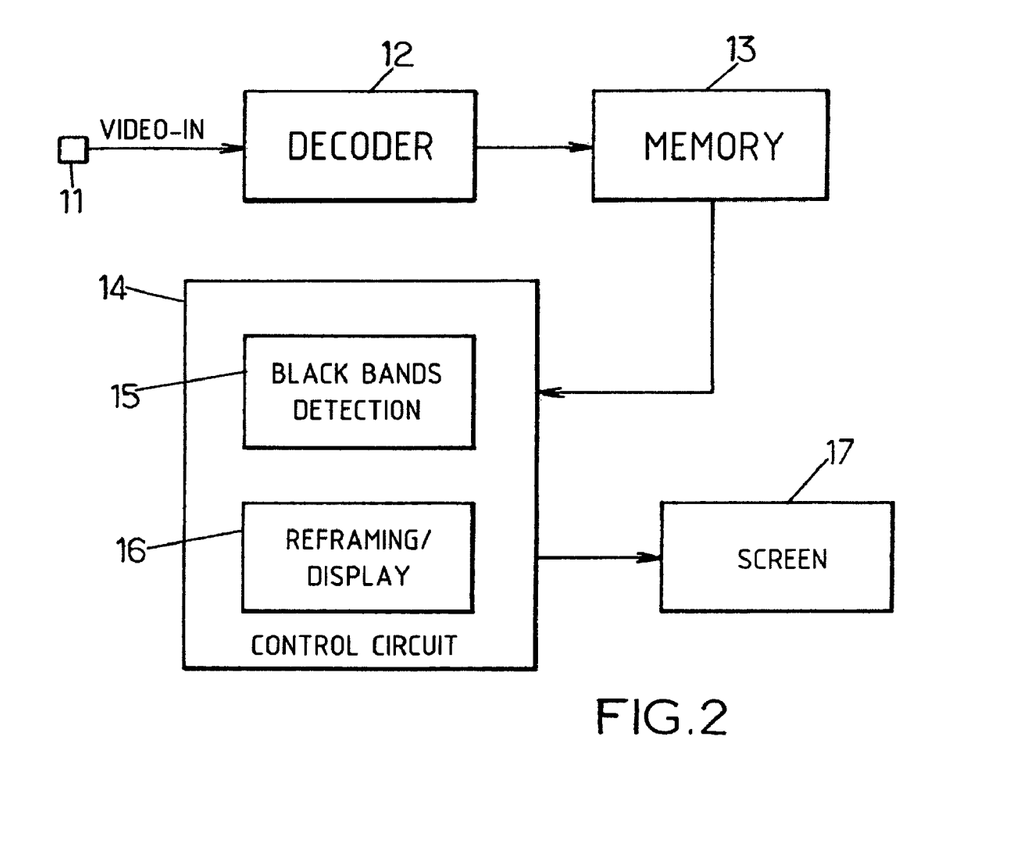
FIG. 2 is a block diagram of a video display system according to one embodiment of the present invention.

FIG. 2 is a block diagram of a display system according to one embodiment of the present invention. Such a system forms, for example, part of a standard television, a widescreen television or the like.

The system 10 comprises an input 11 for receiving an input video signal VIDEO_IN. Such a signal is, for example, the signal delivered by the tuner of the television. It is a coded signal which represents the video to be displayed. The signal VIDEO_IN is input to a decoder circuit 12, which carries out the decoding of the signal.

In the example considered here, the original video is coded in accordance with the ITU-R BT.601 standard of the ITU (the standard formerly known as CCIR 601), which is the standard for in-studio coding of digital television for 4/3 (standardized) and 16/9 (widescreen) image formats. This standard prescribes a processing of the video component-wise, that is to say using three components for the coding of the pixels. In this example, a coding of the pixels in the Y Cb Cr colorimetric system is considered. In this system, Y denotes, for a pixel, the luminance component which corresponds to a black and white signal, and Cb and Cr denote the chrominance components which are independent of the luminance and correspond to color difference signals, respectively between the luminance and the blue color and between the luminance and the red color.

While the Y Cb Cr calorimetric system and a certain standard are used in this example, the present invention is in no way limited to this example. For example, the component-wise coding of the pixels can be a coding in the RGB (Red, Green, Blue) calorimetric system which gives a representation of a pixel by the combination of the values of three color components, namely red, green and blue.

As shown, the data output by the decoder 12 is stored temporarily in a memory 13. This memory is dubbed the "field memory" since the data of an image is advantageously stored per field. Current practice with respect to analog broadcast television actually consists in transmitting two fields per image in succession since the display standards in force correspond to an interlaced display (the odd lines are displayed via a first scan of the screen, then the even lines are displayed via a second scan). Nevertheless, certain digital transmission systems provide for frame-wise transmission, with a frame corresponding to a complete image.

The capacity of the memory 13 is such that it can store as a minimum the pixel values of a field.

The process of the present invention can be implemented with the format of the video source being either analog or digital. For analog images, the pixel values can, for example, be stored in "raster" fashion. For the digital images (coming from an MPEG decoder, for example), they can be stored in "macroblock" fashion.

A control circuit 14 can read-access the pixel values stored in the memory 13. The circuit 14 comprises a module 15 for detecting black bands in a current image to be displayed, and a module 16 which controls the reframing and the display of the current image.

The control circuit 14 drives a screen 17 such as a CRT screen ("Cathode Ray Tube"), an LCD screen or a plasma screen.

The control circuit 14 is, for example, a microprocessor driven by an application program stored permanently in a memory (such as the memory 13). Such a microprocessor is already present in most televisions currently sold. As a variant, the control circuit may be a correctly programmed microcontroller. In both cases, the modules 15 and 16 are preferably embodied in the form of software units. As another variant, the control circuit 14 may be a dedicated integrated circuit, or an assemblage of hardware components and/or of software units designed specially for the implementation of the present invention. For example, the module 16 can be embodied in the form of a piece of hardware driven by a microprocessor or microcontroller.

Figure 3:
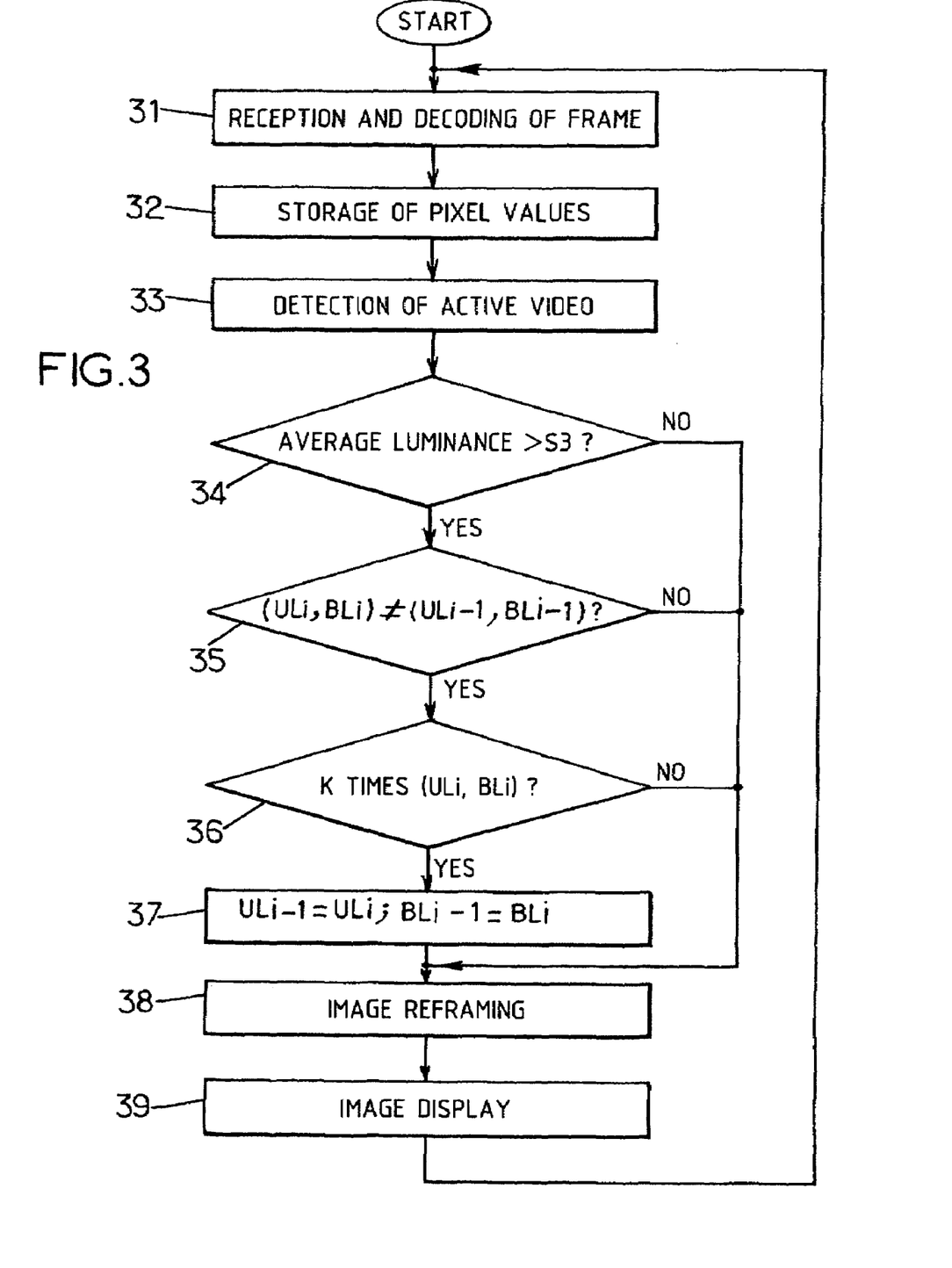
FIG. 3 is a flow chart illustrating a display process according to one embodiment of the present invention.

FIG. 3 is a flow chart of a display process according to one embodiment of the present invention.

In step 31, a video frame, that is to say the data coding an entire current image, is received on the input 11. This data is decoded by the decoder 12.

In step 32, the values of at least some of the pixels of the image are stored in the memory 13. Only the values of some pixels of the image, referred to below as the reference pixels, are required for the implementation of the present invention. This is why, preferably, only the values of these reference pixels are stored in the memory 12. Nevertheless, it is also possible to store in memory the value of all the pixels of the image. In an application where all the pixels of the image are systematically stored in the field memory of the television, the implementation of the present invention does not involve any additional need in terms of storage capacity. In this example, the values of the components Y, Cb and Cr associated with each pixel considered are stored in the memory 13.

In step 33, the detection of the black bands in the image is carried out. This step is implemented by the module 15 of the control circuit 14. Its aim is to determine the first line ULi and the last line BLi of the active video of the current image, that is to say the first and the last line of the current image which are not black lines. The detail of an exemplary implementation of this step 33 is given hereinbelow with reference to the flow chart of FIG. 4.

Figure 4:
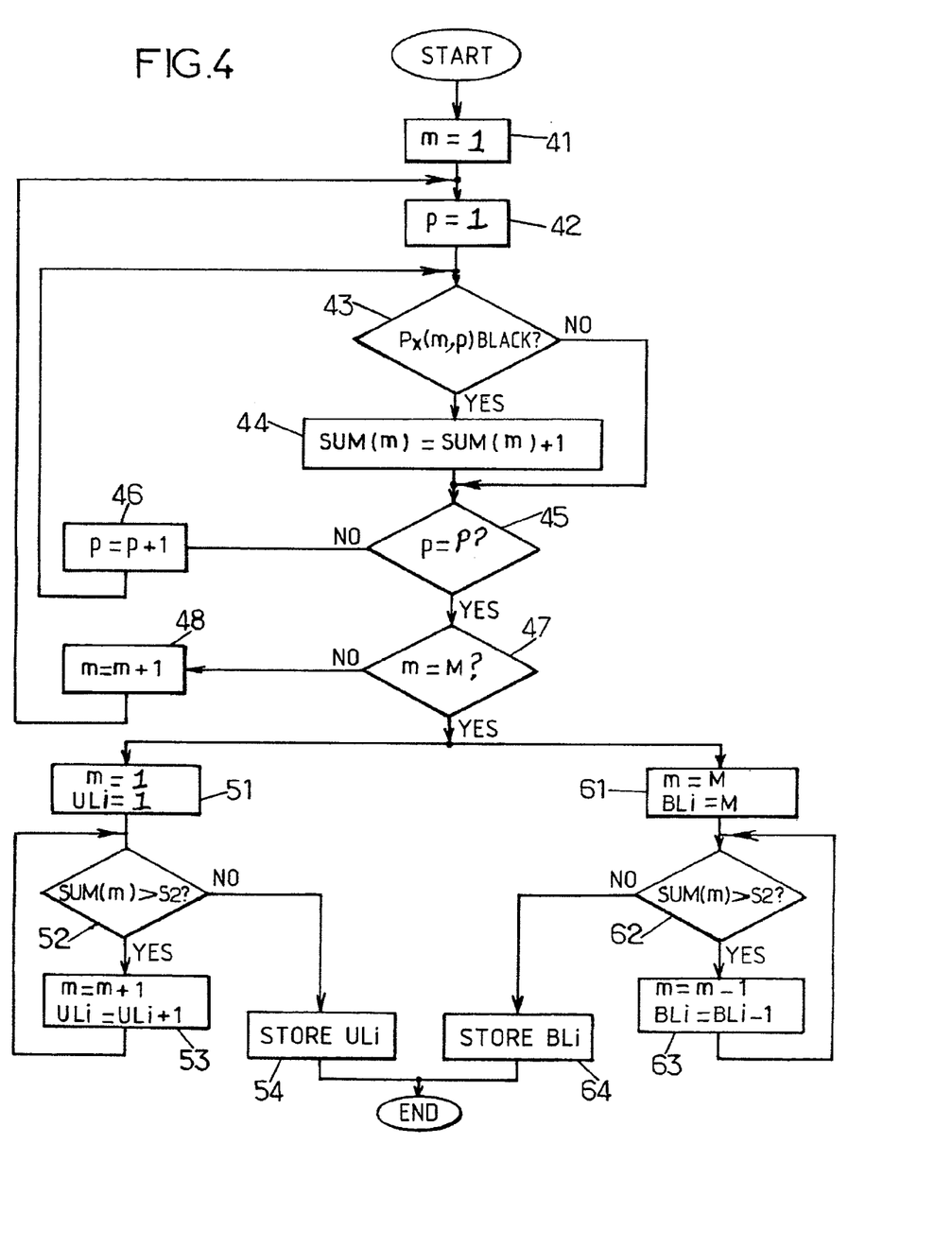
FIG. 4 is a flow chart showing in detail an exemplary process for detection of the active video in an image in accordance with an embodiment of the present invention.

For this exemplary implementation of the detection of the active image, two indices m and p are defined which make it possible to tag the reference pixels denoted Px(m,p). The index m is an integer lying between 1 and M, where M is an integer which denotes the number of video lines of the image. The index p is an integer lying between 1 and P, where P is an integer which denotes the number of reference pixels in each line. The number P is less than a predetermined number N, which is an integer which denotes the number of pixels constituting each line of the image.

For each line of index m of the image, that is to say for m lying between 1 and M, a parameter SUM(m) is defined which corresponds to the number of reference pixels from among the pixels Px(m,1) to Px(m,P) which are (regarded as) black according to a first predetermined criterion. The higher this parameter, the more the line may be regarded as black. This is why a second criterion is also defined which makes it possible to regard a line as black or nonblack, with this second criterion being based on the parameter SUM(m) associated with the line considered.

As shown in FIG. 4, in a first group of steps 41 to 48, the value of the parameter SUM(m) associated with each line of index m is determined, with m ranging from 1 to M. In steps 51 to 54, the first nonblack line of the current image is determined, by exclusion of the lines which are (regarded as) black (according to the aforesaid second criterion) when the lines of the image are examined in succession starting from the first line of the image. In steps 61 to 64, the last nonblack line of the current image is determined, by exclusion of the lines which are regarded as black when the lines of the image are examined in succession starting from the last line of the image.

More specifically, in initialization steps 41 and 42, the indices m and p, respectively, are initialized to unity (m=1, p=1).

In step 43, it is determined whether the reference pixel Px(m,p) may be regarded as black according to the first aforesaid criterion. In an advantageous embodiment, when the video is a color video represented as luminance and chrominance components, this first criterion takes into account the luminance component and, preferably, also the value or values of the chrominance components of the pixels. In this example, the first criterion thus includes the comparison of the value of the luminance component Y with predetermined thresholds (luminance thresholds). In an advantageous embodiment, it furthermore includes the comparison of the chrominance component Cb and/or of the chrominance component Cr with other predetermined thresholds (chrominance thresholds).

If the pixel Px(m,p) is regarded as black, then in step 44, the parameter SUM(m) is incremented by one unit and the process then goes to step 45. In the converse case, the process goes directly to step 45.

In step 45, it is determined whether all the reference pixels of the line of index m have been examined, by comparing the value of the index p with the number P. If p is equal to P then the process goes to step 47. In the converse case, the process goes to step 46 in which the index p is incremented by one unit and then goes back to step 43.

In step 47, it is determined whether all the lines of the image have been examined, by comparing the value of the index m with the value M. If m is equal to M, then the evaluation of the parameter SUM(m) has been terminated for all the lines of the image. In the converse case, the index m is incremented by one unit in step 48, and the process goes back to initialization step 42.

An exemplary implementation of steps 41 to 48 described above, in the form of code lines of a computer program ("pseudo-code"), is as follows.

```
FOR m = 1 TO M
    FOR p = 1 TO P
        IF (
            y(m,p)<BLACK_LEVEL_LUMA + S1)
            and
            (
            (BLACK_LEVEL_CHROMA-S1' < cb(m,p) <
            BLACK_LEVEL_CHROMA + S1')
            or
            (BLACK_LEVEL_CHROMA-S1' < cr(m,p) <
            BLACK_LEVEL_CHROMA + S1')
            ) THEN
                SUM (m) = SUM (m) + 1
        END IF
    END FOR
END FOR
```

In this exemplary implementation, y(m,p), cb(m,p) and cr(m,p) are the values of the components of the pixel Px(m,p) in the Y Cb Cr colorimetric system;

BLACK_LEVEL_LUMA is the luminance level corresponding to the black color (10h according to the CCIR 601 recommendation);

BLACK_LEVEL_CHROMA is the chrominance level corresponding to the black color (80h according to the CCIR 601 recommendation); and S1 and S1' are fixed values which, in combination with the BLACK_LEVEL_LUMA and BLACK_LEVEL_CHROMA levels, respectively, define the luminance thresholds and the chrominance thresholds, respectively, which were presented above. The first luminance thresholds are BLACK_LEVEL_LUMA-S1 and BLACK_LEVEL_LUMA+S1. The first chrominance thresholds are BLACK_LEVEL_CHROMA-S1' and BLACK_LEVEL_CHROMA+S1'. In this example, the values S1 and S1' are equal to 5h and 10h respectively.

A second group of steps 51 to 54 is used to determine the top lines of the image which may be regarded as black according to the second aforesaid criterion, and to deduce therefrom the index ULi of the first line of the active image (that is to say the first nonblack line) of the current image, so as to serve as a basis for an automatic reframing (or "pan and scan") of the images before display.

In an initialization step 51, the values of the index ULi and the index m are initialized to unity (m=1).

In step 52, it is then determined whether the value of the parameter SUM(m) is greater than a predetermined threshold S2. In this example, the threshold S2 is equal to $$\frac{3}{4} \times P.$$

Nevertheless, any value between $$\frac{1}{2} \times P$$

and P can be used. Specifically, as soon as SUM(m) is greater than $$\frac{1}{2} \times P,$$

the probability that the line is black is higher than the probability that it is nonblack.

If SUM(m) is greater than S2, the line of index m is regarded as black. Then, in step 53, the index m is incremented by one unit, and the process goes back to step 52. In the converse case, the line of index m is regarded as nonblack. It is then the first nonblack line of the image. Then, in step 54, the value ULi thus obtained is stored in memory.

An exemplary implementation of steps 51 to 54 described above, in the form of code lines of a computer program ("pseudo code"), is as follows.

m=1
ULi=1
WHILE (SUM(m)>S2)
   ULi=ULi+1
   m=m+1
END WHILE In a group of steps 61 to 64, which may be carried out after, before, or conjointly with the aforesaid steps 51 to 54, the bottom lines of the image which may be regarded as black according to the same predetermined criterion or according to a similar criterion are determined, and it is deduced therefrom the last line of the active video (that is to say the last nonblack line of the image) to serve as a basis for the reframing of the image.

In an initialization step 61, the values of the index BLi and the index m are initialized to the value M.

In step 62, the value of the parameter SUM(m) is compared with the aforesaid threshold S2 (or with a threshold that may be different). If SUM(m) is greater than S2, then the line of index m is regarded as black. Then, in step 63 the index m is decremented by one unit. The process returns thereafter to step 62. In the converse case, the line of index m is regarded as nonblack. More particularly, it is then the last nonblack line of the image, that is to say the last line of the active video. Then, in step 64, the value BLi is stored in memory.

An exemplary implementation of steps 61 to 64 described above, in the form of code lines of a computer program ("pseudo code"), is as follows.

m=M
BLi=M
WHILE (SUM(m)>S2)
   BLi=BLi-1
   m=m-1
END WHILE Once the first nonblack line ULi and the last nonblack line BLi which have been determined for the current image are known, it would be possible to perform a reframing of the current image before its display by taking the lines ULi and BLi into account. However, for reasons which will become apparent, a series of tests is preferably performed to determine whether it is appropriate to modify values ULi−1 and BLi−1 denoting the upper limit and the lower limit, respectively, of the active video, which were determined earlier with respect to the reframing of the images. The values ULi−1 and BLi−1 correspond to the respective indices of the first nonblack line and of the last nonblack line of an earlier image. This earlier image is not necessarily the previous image (the terms "earlier" and "previous" being employed here with reference to the order of broadcasting of the images of the video).

Returning to FIG. 3, one or more of the tests of steps 34, 35 and 36 are performed, after the step 33 of detecting the active video.

In step 34, it is determined whether the average luminance of the current image is greater than a threshold S3. The average luminance of the image is preferably determined on the basis of the luminance value y(m,p) of the M×P reference pixels, respectively Px(m,p) with m ranging from 1 to M, and p ranging from 1 to P. As a variant, it is also possible to compute an average by taking into account all the pixels of the image, although the calculation of this average is then lengthier. In this example, the value of the threshold S3 is equal to 25h, with this value corresponding to a tenth of the luminance swing in the case of a video in accordance with the CCIR 601 recommendation. If the average luminance of the image is less than this threshold, the determinations of black/nonblack lines performed in step 33 may be regarded as exhibiting a high probability of being erroneous. Such is the case for example with an image corresponding to a very dark scene (for example action which unfolds at night).

In step 35, it is determined whether the distance between the lines ULi and BLi, which were detected in step 33, and the lines ULi−1 and BLi−1, which were determined with respect to the last image reframing performed, is less than a predetermined threshold. Specifically, if this distance is insignificant, then it is unnecessary to proceed with an updating of the values ULi−1 and BLi−1 which are determined for the reframing of the images. This thus avoids overly frequent zooms which might cause an image jerk effect which is unpleasant for the user.

With a similar aim, in step 36 it is determined whether the new dimensions of the active video, which are defined by the lines ULi and BLi, have been with a certain stability for the previous K images, where K is an integer. Stated otherwise, in step 36 it is determined whether the distance between the first nonblack line and the last nonblack line of the current image, and the first nonblack line and the last nonblack line, respectively, of each of the previous K images, is less than a predetermined threshold. In this example, K is equal to 10.

If the response to at least one of the tests of steps 34, 35 and 36 is negative, then the current image is reframed, in step 38, and then displayed, in step 39, without first updating the values ULi−1 and BLi−1. In the converse case, the indices of the lines ULi−1 and BLi−1 are replaced with those of the lines ULi and BLi respectively, in step 37. Thereafter, a reframing of the image is performed in step 38, and the process then goes to step 39 where the reframed image is displayed. The reframing of step 38 is typically a zoom, which may be a zoom-in (corresponding to an enlarging of the image) or a zoom-out (corresponding to a diminishing of the image), on the basis of the upper and lower limits of the active video ULi−1 and BLi−1.

Figure 5:
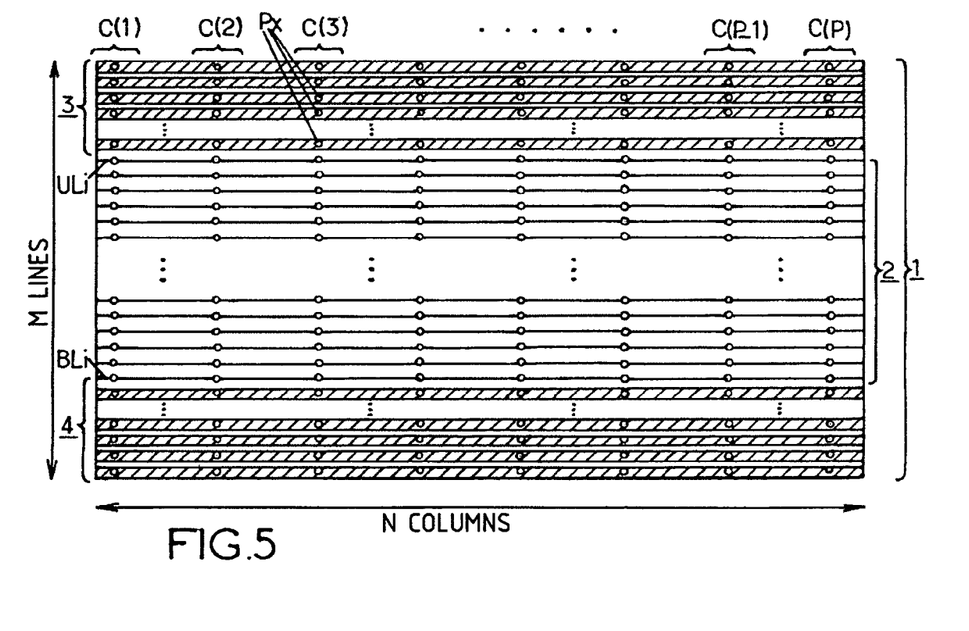
FIG. 5 is a diagram illustrating a first exemplary distribution of the reference pixels in a line of the image.
Figure 6:
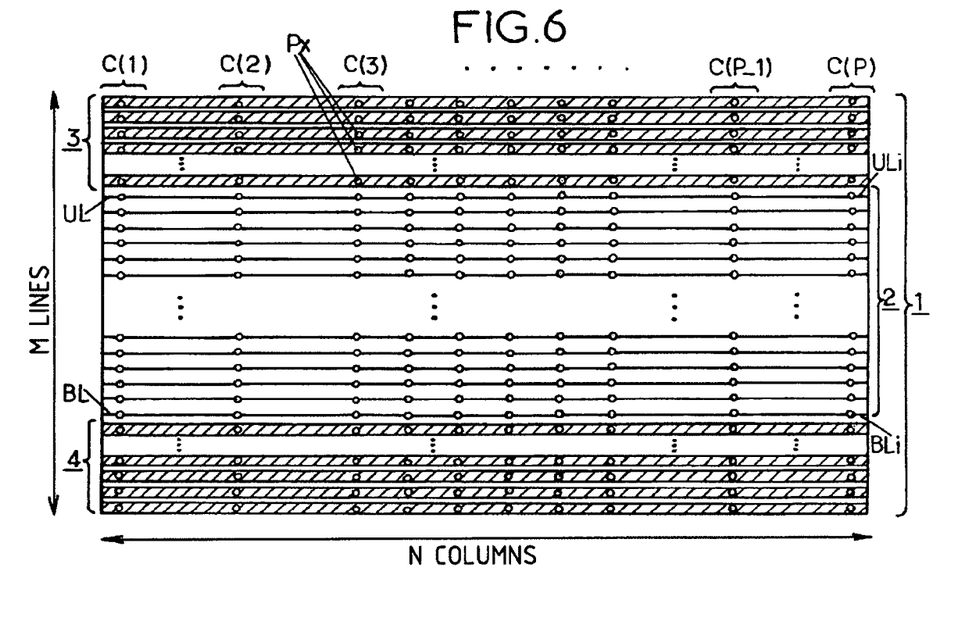
FIG. 6 is a diagram illustrating a second exemplary distribution of the reference pixels in a line of the image.

FIG. 5 and FIG. 6 respectively are a first and a second exemplary distribution of the reference pixels in each line of the image. The lines of the image 1 are represented in disjoint fashion in the form of thick horizontals for the lines of the upper and lower black bands 3 and 4, and in the form of thin horizontals for the lines of the active image 2. The reference pixels Px are represented by points. In the examples shown in FIGS. 5 and 6, the distribution of the reference pixels Px(m,1) to Px(m,P) of the line of index m is the same whatever the value of the index m. Stated otherwise, the distribution of the reference pixels in a line is the same for all the lines. The reference pixels Px are therefore distributed within the image by being disposed along predetermined columns C(1) to C(P), with each of these columns comprising one pixel Px per line. This constitutes a nonlimiting example which has the advantage of simplifying the implementation of the present invention.

In the example illustrated by FIG. 5, the distribution of the P reference pixels Px in each line is substantially uniform. Stated otherwise, the columns C(1) to C(P) are substantially evenly spaced.

This configuration makes it possible to not neglect any part of the image with respect to the others.

In the example illustrated by FIG. 6, the distribution of the P reference pixels Px in each line is nonuniform. In this example, more pixels Px are situated at the center of the line than at the left and/or right ends of the line. Stated otherwise, the columns C(1) to C(P) are concentrated towards the middle of the image, with their density there being larger than towards the left edge and the right edge of the image.

This configuration makes it possible to reduce the probability that a line of black bands 3 and 4 into which a logo (for example the logo of the producer of the images) might be inlaid is regarded as a nonblack line. It is indeed customary for the producer of images to exploit the black bands in order to insert his logo for advertising purposes. This logo is generally situated at the top left, at the top right, at the bottom left or at the bottom right of the images, at least in part within the black bands. This logo is of no visual interest to the user and it is preferable to regard the lines which contain it as being black lines.

Moreover, this configuration makes it possible to minimize the probability that lines containing subtitles are regarded as black lines and eliminated from the displayed image on account of the reframing of the image. Specifically, such subtitles are conventionally contained in the middle of the bottom lines of the image, and appear as white or yellow color characters (letters, digits, or the like), and in all cases have high luminance.

According to an advantageous exemplary implementation, the step 33 of detecting the black bands terminates with a step of detecting subtitles in the bottom black lines of the image, from the values of the reference pixels belonging to these black lines. This step involves, for example, determining, among the (M−BLi)×P reference pixels belonging to the lines of the lower black band 4, the number of those whose value of luminance component y(m,p) is greater than a predetermined WHITE_LEVEL threshold. In this example, the value of the WHITE_LEVEL threshold is equal to around 200h. If this number is greater than a predetermined percentage of the number (M−BLi)×P, for example 2%, the probability of having subtitles in the band 4 is regarded as considerable. In this case, the value BLi determined in step 33, which corresponds to the index of the last nonblack line, is replaced with the value M which corresponds to the index of the last line of the image. In this way, the image displayed is reframed before display, in the case of detection of subtitles, on the basis of the first nonblack line and of the last line of the image. Stated otherwise, the lower band 4 containing the subtitles is displayed.

According to another advantageous exemplary implementation, the layout (or locations) of the reference pixels in the image varies over time, for example from one image to another. This variation can consist in causing the place of the columns containing reference pixels to change when the reference pixels are disposed in predetermined columns of the image. Stated otherwise, the sampling of the image by the reference pixels is dynamic instead of being static.

In this way, more pixels of the image are taken into account over time (in several successive images of the video). For example, it may be contrived in such a way that all the pixels of the image are reference pixels in at least some of the images of the video. In this way, the probability of false detection of black lines is reduced. The process is thus rendered more robust, and is not stumped by specific videos, in particular static videos (such as a test card).

The variation in the layout of the reference pixels may be random or periodic, for example it may vary with each image, or every X images, where X is a predetermined integer.

The present invention can be implemented in hardware, software, or a combination of hardware and software. Any processor, controller, or other apparatus adapted for carrying out the functionality described herein is suitable. A typical combination of hardware and software could include a general purpose microprocessor (or controller) with a computer program that, when loaded and executed, carries out the functionality described herein.

The present invention can also be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after either or both of the following a) conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for displaying a video composed of images each comprising a predetermined number M of lines and, a predetermined number N of pixels in each line, where M and N are integers, the method comprising the steps of:
   storing in memory values of a predetermined number P of reference pixels for each line of a current image of the video, where P is an integer that is less than N;
   determining, for each line of the current image, the value of a parameter associated with the line, the parameter corresponding to the number of the reference pixels of the line that are black according to a first predetermined criterion; and
   determining a first nonblack line and a last nonblack line of the current image to serve as a basis for an automatic reframing of the images of the video before display, the first nonblack line of the current image being determined by excluding, starting from a first line of the image, the lines of the image which are black according to a second predetermined criterion based on the parameter, and the last nonblack line of the current image being determined by excluding, starting from a last line of the image, the lines of the image which are black according to the second predetermined criterion based on the parameter.

2. The method according to claim 1, wherein a distribution of the reference pixels in at least one of the lines is substantially uniform.

3. The method according to claim 1, wherein a distribution of the reference pixels in at least one of the lines is nonuniform, with more reference pixels being located near the center of the line than at the left and/or right ends of the line.

4. The method according to claim 1, wherein a distribution of the reference pixels is the same for all of the lines of the current image.

5. The method according to claim 1, wherein locations of the reference pixels vary over time.

6. The method according to claim 1,
   wherein the video is a color video represented as luminance and chrominance components, and
   the first criterion includes comparing a value of the luminance component of the reference pixel with at least one predetermined threshold.

7. The method according to claim 6, wherein the second criterion includes comparing a value of the parameter with a predetermined threshold.

8. The method according to claim 1,
   wherein the video is a color video represented as luminance and chrominance components, and
   the first criterion includes comparing a value of the luminance component of the reference pixel with at least one first predetermined threshold, and comparing a value of at least one chrominance component of the reference pixel with at least one second predetermined threshold.

9. The method according to claim 1, wherein the second criterion includes comparing a value of the parameter with a predetermined threshold.

10. The method according to claim 1, further comprising a step of reframing the current image before display either: on the basis of the first nonblack line and the last nonblack line of the current image, or on the basis of the first nonblack line and the last nonblack line of an earlier image of the video if at least one of one or more conditions is not achieved.

11. The method according to claim 10,
    wherein the one or more conditions include first, second and third conditions,
    the first condition is that an average luminance of the current image is less than a predetermined threshold,
    the second condition is that a distance between the first nonblack line and the last nonblack line of the current image, and the first nonblack line and the last nonblack line of the earlier image is less than a first predetermined threshold, and
    the third condition is that a distance between the first nonblack line and the last nonblack line of the current image, and the first nonblack line and the last nonblack line of each of K previous images, is less than a second predetermined threshold, where K is a predetermined integer.

12. The method according to claim 1, further comprising a steps of:
    detecting subtitles in the black lines at the bottom of the image; and
    if subtitles are detected, reframing the current image before display on the basis of the first nonblack line and the last line of the image.

13. A machine-readable medium encoded with a program for displaying a video composed of images each comprising a predetermined number M of lines and, a predetermined number N of pixels in each line, where M and N are integers, the program containing instructions for performing the steps of:
    storing in memory values of a predetermined number P of reference pixels for each line of a current image of the video, where P is an integer that is less than N;
    determining, for each line of the current image, the value of a parameter associated with the line, the parameter corresponding to the number of the reference pixels of the line that are black according to a first predetermined criterion; and
    determining a first nonblack line and a last nonblack line of the current image to serve as a basis for an automatic reframing of the images of the video before display, the first nonblack line of the current image being determined by excluding, starting from a first line of the image, the lines of the image which are black according to a second predetermined criterion based on the parameter, and the last nonblack line of the current image being determined by excluding, starting from a last line of the image, the lines of the image which are black according to the second predetermined criterion based on the parameter.

14. The machine-readable medium according to claim 13, wherein the video is a color video represented as luminance and chrominance components, and the first criterion includes comparing a value of the luminance component of the reference pixel with at least one predetermined threshold.

15. The machine-readable medium according to claim 13, wherein the second criterion includes comparing a value of the parameter with a predetermined threshold.

16. The machine-readable medium according to claim 13, wherein the program further contains instructions for performing the step of reframing the current image before display either: on the basis of the first nonblack line and the last nonblack line of the current image, or on the basis of the first nonblack line and the last nonblack line of an earlier image of the video if at least one of one or more conditions is not achieved.

17. The machine-readable medium according to claim 13, wherein the program further contains instructions for performing the steps of:
detecting subtitles in the black lines at the bottom of the image; and
if subtitles are detected, reframing the current image before display on the basis of the first nonblack line and the last line of the image.

18. A system for displaying a video composed of images each comprising a predetermined number M of lines, and a predetermined number N of pixels in each line, where M and N are integers, the system comprising:
a memory for storing values of a predetermined number P of reference pixels for each line of a current image of the video, where P is an integer that is less than N;
first means for determining, for each line of the current image, the value of a parameter associated with the line, the parameter corresponding to the number of the reference pixels of the line that are black according to a first predetermined criterion, and for determining a first nonblack line of the current image by excluding, starting from a first line of the image, the lines of the image which are black according to a second predetermined criterion based on the parameter, and for determining a last nonblack line of the current image by excluding, starting from a last line of the image, the lines of the image which are black according to the second predetermined criterion based on the parameter; and
second means for automatically reframing the current image before display based on a first nonblack line and a last nonblack line.

19. The system according to claim 18, wherein a distribution of the reference pixels in at least one of the lines is substantially uniform.

20. The system according to claim 18, wherein a distribution of the reference pixels in at least one of the lines is nonuniform, with more reference pixels being located near the center of the line than at the left and/or right ends of the line.

21. The system according to claim 18, wherein a distribution of the reference pixels is the same for all of the lines of the current image.

22. The system according to claim 18, wherein locations of the reference pixels vary over time.

23. The system according to claim 18,
wherein the video is a color video represented as luminance and chrominance components, and
the first criterion includes comparing a value of the luminance component of the reference pixel with at least one predetermined threshold.

24. The system according to claim 18,
wherein the video is a color video represented as luminance and chrominance components, and
the first criterion includes comparing a value of the luminance component of the reference pixel with at least one first predetermined threshold, and comparing a value of at least one chrominance component of the reference pixel with at least one second predetermined threshold.

25. The system according to claim 18, wherein the second criterion includes comparing a value of the parameter with a predetermined threshold.

26. The system according to claim 18, wherein the second means reframes the current image before display either: on the basis of the first nonblack line and the last nonblack line of the current image, or on the basis of the first nonblack line and the last nonblack line of an earlier image of the video if at least one of one or more conditions is not achieved.

27. The system according to claim 26,
wherein the one or more conditions include first, second and third conditions,
the first condition is that an average luminance of the current image is less than a predetermined threshold,
the second condition is that a distance between the first nonblack line and the last nonblack line of the current image, and the first nonblack line and the last nonblack line of the earlier image is less than a first predetermined threshold, and
the third condition is that a distance between the first nonblack line and the last nonblack line of the current image, and the first nonblack line and the last nonblack line of each of K previous images, is less than a second predetermined threshold, where K is a predetermined integer.

28. The system according to claim 18, further comprising:
means for detecting subtitles in the black lines at the bottom of the image,
wherein if subtitles are detected, the second means reframes the current image before display on the basis of the first nonblack line and the last line of the image.

* * * * *

UNITED STATES PATENT AND TRADEMARK OFFICE
CERTIFICATE OF CORRECTION

PATENT NO. : 7,129,992 B2  Page 1 of 1
APPLICATION NO. : 10/678967
DATED : October 31, 2006
INVENTOR(S) : Christophe Barnichon It is certified that error appears in the above-identified patent and that said Letters Patent is hereby corrected as shown below:

Column 4, line 22, from "calorimetric" to -- colorimetric--
Column 4, line 26, from "calorimetric" to -- colorimetric--

Signed and Sealed this

Ninth Day of January, 2007

JON W. DUDAS
*Director of the United States Patent and Trademark Office*